Figure 1:
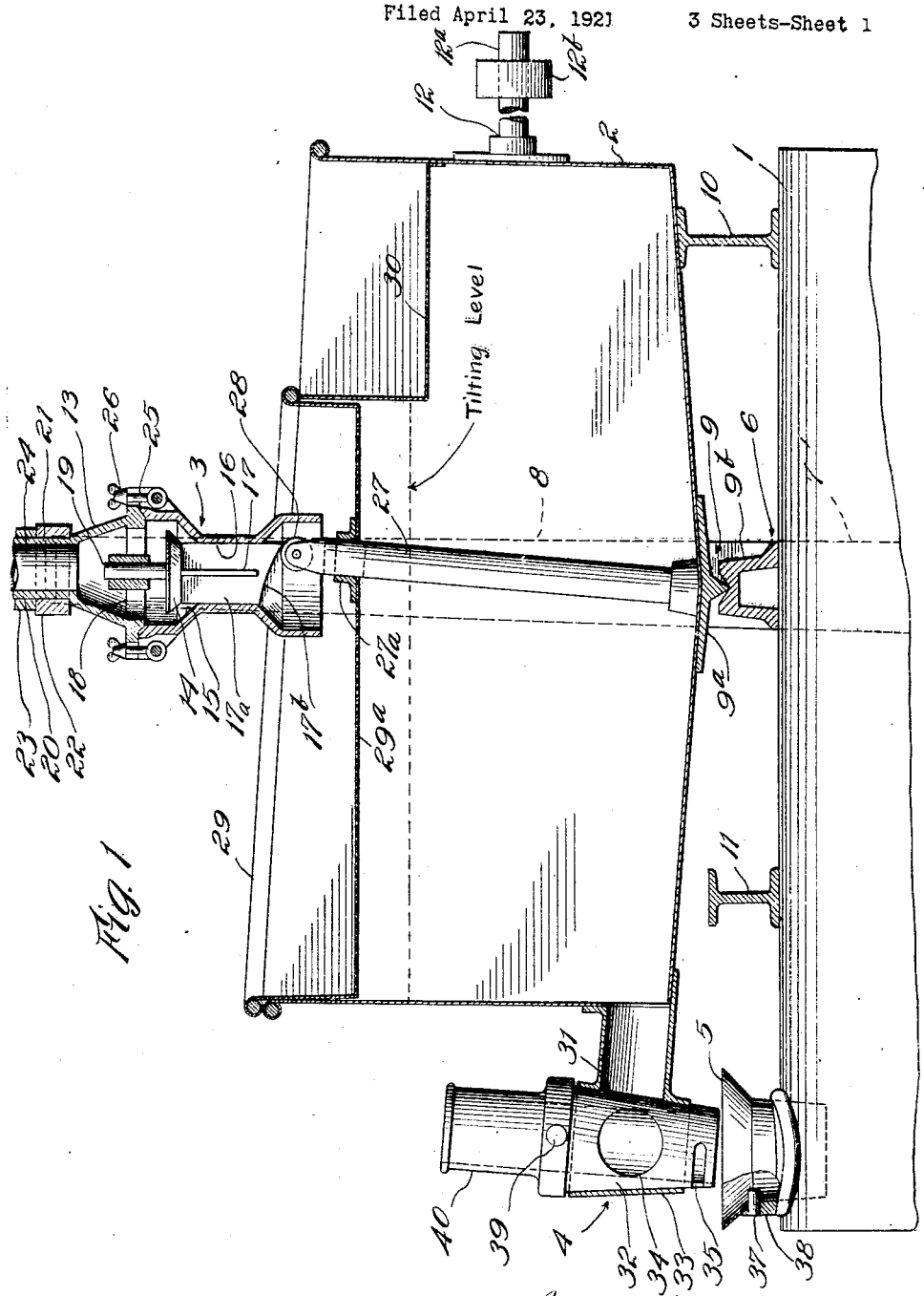

Feb. 10, 1925.

T. L. VALERIUS
ICE CREAM FREEZER
Filed April 23, 1921

1,525,521

3 Sheets-Sheet 1

Inventor
T. L. Valerius
By Miller Chindahl Parker
Attys

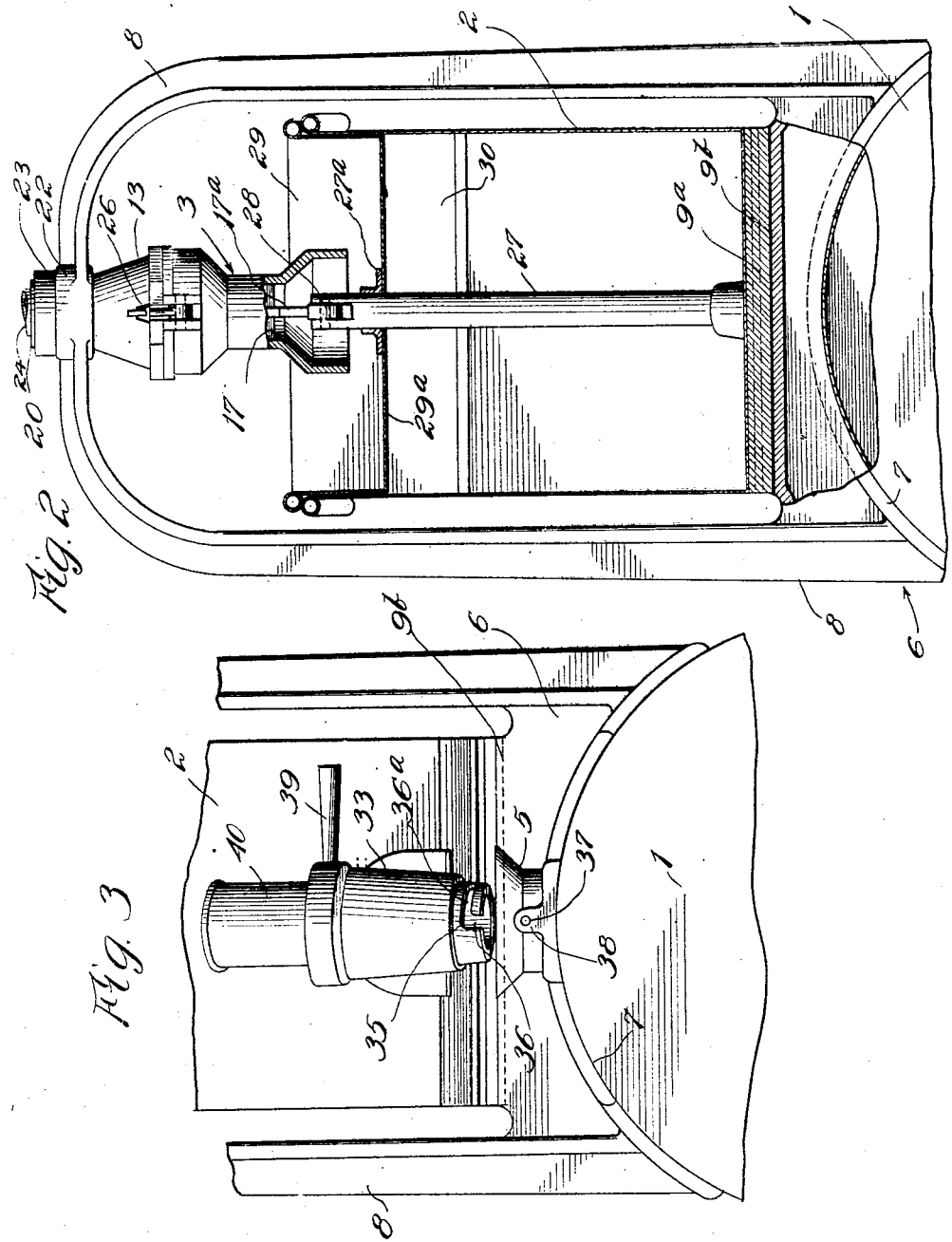

Feb. 10, 1925.
T. L. VALERIUS
ICE CREAM FREEZER
Filed April 23, 1921
1,525,521
3 Sheets-Sheet 3
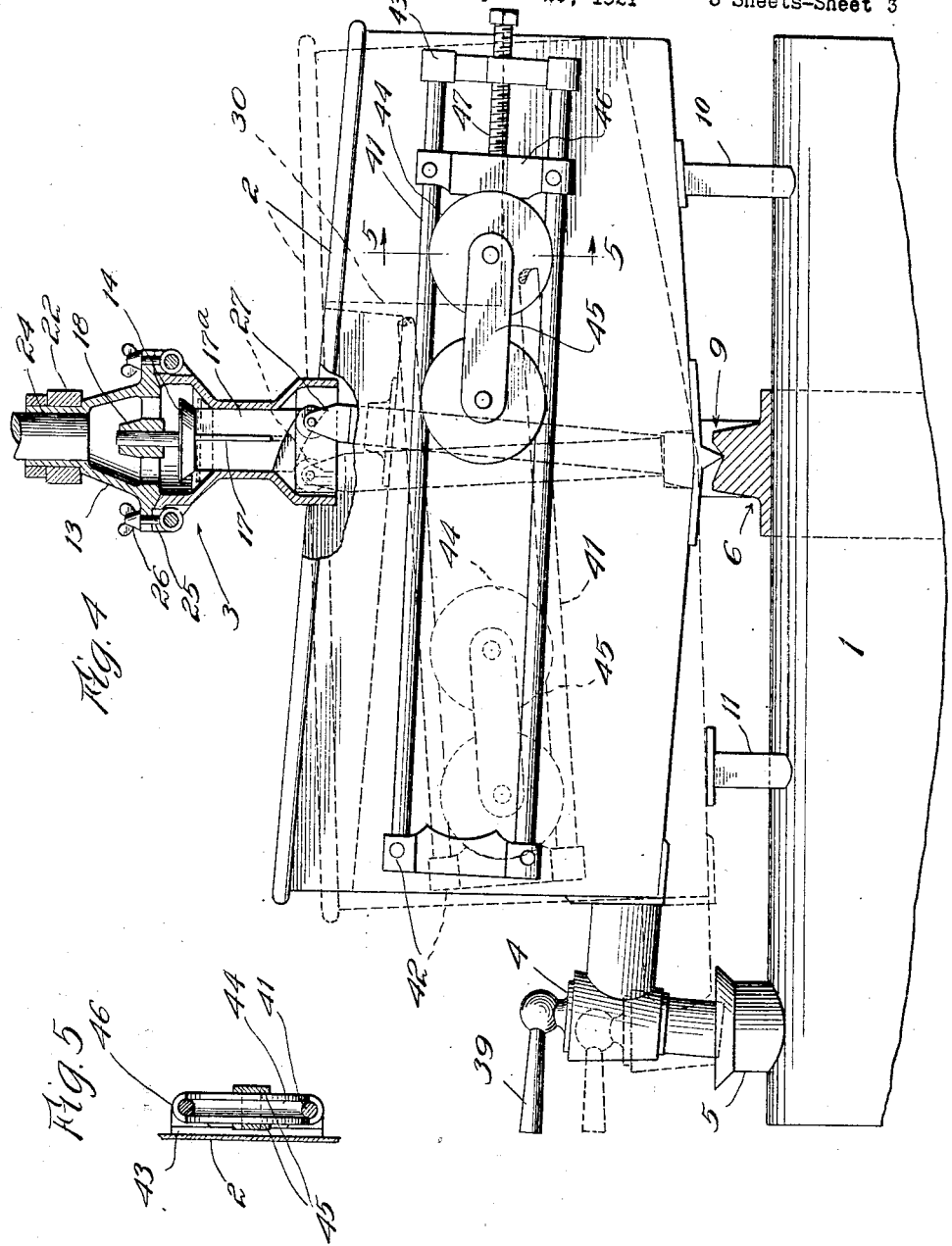
Inventor
T. L. Valerius Patented Feb. 10, 1925.

1,525,521

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ICE-CREAM FREEZER.

Application filed April 23, 1921. Serial No. 463,787.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Ice-Cream Freezers, of which the following is a specification.

The invention pertains to ice cream freezers of the type which is equipped with a feed or batch tank adapted to discharge the mixture to be frozen into the freezing chamber.

The general aim of the invention is to provide a freezer having a batch tank automatically operable to measure the mixture flowing from the mixer or storage tank, or other suitable source of supply, for discharge into the freezer cylinder in predetermined quantities.

The invention involves the employment of means of an advantageous character for controlling the flow of the mixture to the batch tank by a tilting movement of the tank from a normal substantially horizontal position to an inclined or discharging position, and of means for holding the tank in its inclined position during the discharge of the mixture therefrom.

The objects of the invention thus generally stated, together with other and ancillary advantages, which will be apparent as the description proceeds, may be attained by the construction and arrangement illustrated in the accompanying drawings forming part hereof, wherein Figure 1 is a fragmentary vertical sectional view showing a freezer equipped with my improved batch tank. Fig. 2 is a fragmentary end elevation, partially in section. Fig. 3 is an end view showing particularly one form of means for holding the tank in its discharging position. Fig. 4 is a view similar to Fig. 1, but illustrating another form of the tank holding means. Fig. 5 is a fragmentary transverse sectional view taken substantially in the plane of line 5—5 of Fig. 4.

Referring to Figure 1 of the drawings, 1 designates the cylinder of an ice cream freezer, and 2 indicates a tiltable batch tank normally supported in the position shown in full lines in Fig. 1 and automatically operable when the level of the liquid flowing into the tank attains a predetermined height to move into a discharging position. An inlet valve designated generally by the numeral 3 is operable in such movement of the tank 2 to cut off the flow of liquid to the tank. 4 is a valved outlet for the tank adapted to discharge into the cylinder inlet funnel shown at 5.

The freezer herein shown is of the horizontal type, but it will be understood that the invention is not limited to any particular form of freezer since it is obvious that it may be of any suitable or preferred construction.

The batch tank 2 is mounted above the cylinder 1 upon a supporting frame 6. As shown in Figs. 2 and 3, said frame comprises a lower arcuate base portion 7 fitting over the cylinder 1 and suitably secured thereto. Rising from the arcuate base portion 7 is an inverted U-shaped upright portion 8 which encircles the tank. A knife edge bearing 9 is provided for the tank, consisting of a V-shaped bearing member $9^a$ secured to the under side of the tank substantially centrally thereof and a V-notched bearing member $9^b$ provided by the supporting frame 6. Normally the tank is supported in a substantially horizontal position, the end of the tank opposite the discharge end being in this position supported by a member 10 also mounted upon the upper surface of the freezer cylinder 1. For supporting the opposite end of the tank when the latter is in its inclined or discharging position, there is provided a supporting member 11 of substantially less height than the member 10 and also carried by the cylinder 1. For the purpose of normally maintaining the tank in its horizontal or filling position, an adjustable counterbalancing device 12 may be provided (Fig. 1) at the end of the tank opposite the discharge end. This device consists of a horizontal arm $12^a$ secured to and extending laterally from the tank and a shiftable weight $12^b$ carried by the arm $12^a$.

The filling valve 3 comprises a casing 13 having a vertically movable valve in the form of a disk 14 operable in its lower portion, the casing providing a seat 15 upon which the valve is normally adapted to rest, and a guideway 16 for radial wings 17 and $17^a$ rigid with and depending from the valve disk 14. In the upper portion of the casing is a spider 18 forming a guide for a stem 19 rising from the disk 14. The upper end of the casing is reduced in diameter to provide an annular or neck portion 20 which passes through an opening 21 provided in a central boss 22 at the upper end of the frame 8. The extreme upper end of said neck is screw-threaded to receive a nut 23 between which and an annular shoulder provided by the casing is clamped the boss 22. A discharge pipe 24 leading from a mixer or an elevated storage tank, is entered into the neck 20. Preferably the casing 13 is made sectional in form, being divided horizontally to form an upper section and a lower section. Said sections are preferably secured together by means of pivoted bolts 25 entered in registering slots in the two sections and provided with wing nuts 26 for detachably securing the two sections together.

When the tank 2 is in its normal or horizontal position, the valve disk 14 is held raised from its seat 15 by means of an arm 27 rigid with the tank and having a bearing engagement with the wing 17$^a$ depending from the disk 14. Herein the arm 27 is fixed at its lower end to the bottom of the tank 2, and its upper end is bifurcated to receive a roller 28 adapted to engage with the lower edge of the wing 17$^a$. As shown in Fig. 1 said lower edge of the wing 17$^a$ is inclined as at 17$^b$ upwardly toward the discharge end of the tank. Thus it will be apparent that when the tank tilts from its normal horizontal position to its inclined or discharging position, the valve, riding upon the roller 28, is permitted to descend, the arrangement being such that when the tank has reached its discharging position the valve disk 14 rests upon its seat 15 to cut off the flow of the mixture into the tank. Near its upper end the arm 27 passes through a flanged collar 27$^a$ which is secured upon the upper side of the screening element 29$^a$ of a strainer 29 removably supported in the upper portion of the tank. To permit of the removal of the strainer, the upper end of the arm 27 is tapered, the roller 28 being made of a diameter equal to or less than the width or thickness of the arm 27. Normally the lower or discharge end of the casing 13 depends into the strainer 31 and surrounds the upper end of the arm 27. When, therefore, the strainer is to be removed, the lower portion of the casing is first detached by loosening the thumb nuts 26 and disengaging the bolts 25.

Within the upper portion of the tank at the end thereof opposite the valved outlet, there is provided a displacement chamber 30 which is so arranged that when the level of the liquid or mixture rising in the tank 2 attains a height determined by the adjustment of the counterbalancing device 12, the relatively greater volume of the liquid in the opposite end of the tank causes the latter to tilt upon its bearing 9 into a discharging position in which it rests upon the supporting member 11, inclined downwardly in the direction of the valved outlet toward which the mixture thus flows freely. In this movement of the tank the valved outlet 4 enters the funnel 5 which constitutes the inlet opening for the freezing chamber, and the valve is manually operated to permit the liquid in the batch tank 2 to flow into the freezer cylinder.

The valved outlet 4 may be of any suitable or well known character. Herein it comprises a casing having a horizontal portion 31 communicating with the batch tank 2. A valve member 32 is operable in an upright portion 33 of the casing, and is provided with a port 34 adapted to register with the horizontal portion 31 communicating with the tank. The valve member 32 is shown as being slightly tapered or conical in form, and its lower end projects slightly below the vertical portion 33 of the casing and is provided with a bayonet slot 35. The upright portion 36 of the slot (Fig. 3) is adapted, when the valve is in its closed position to receive a pin 37 carried by an upstanding lug 38 at one side of the funnel 5 and projecting radially inward through the funnel; and when the valve member is rotated to permit the discharge of the mixture, the pin enters the horizontal portion 36$^a$ of the slot and thus locks the tank in its inclined position. For enabling the operation of the valve member 32 it is provided with a handle 39 above the casing 33. A fruit feed funnel 40 is carried by the upper end of the valve member 32.

The operation of my improved batch measuring device will, it is thought, be readily understood. The mixture flows into the tank by way of a valved inlet 3 until its level reaches a height determined by the position of the weight 12$^b$ of the counterbalancing device, and when a sufficient quantity of the liquid has been displaced to overcome the counterbalancing effect of the weight, the tank tilts upon its bearing 9 into its inclined discharging position. In this movement, the valved inlet 3 is closed by the descent of the valve member 14 as permitted by the arm 27; and the tank is locked in its discharging position in the operation of the valve member 32 into its open position. When the mixture has been discharged from the tank 2 and it is desired to refill the tank with a new charge or batch, the operator manipulates the valve member 32 into its closed position, whereupon the tank resumes its normal horizontal position. In such return movement of the tank, the inlet valve member 14 is opened and the mixture flows into the tank until the latter is again tilted as before.

In Fig. 4 I have illustrated a modified form of means for holding the tank in its discharging position. This means comprises a counterbalancing device which is movable, upon the tilting of the tank into its discharging position, from a normal position in which it serves to hold the tank in horizontal position to a holding position at the opposite end of the tank. Thus it comprises a pair of rods 41 rigidly mounted upon one side wall of the tank 2, as by means of end brackets 42 and 43, in spaced relation so as to provide tracks for grooved rollers 44 operatively connected by a pair of spaced links 45 and constituting counterbalancing weights. An adjustable stop member 46 is mounted upon the rods 41 and is held in various positions of adjustment by means of a stop screw 47 threaded into the bracket 43. It will be apparent that by adjusting the position of the stop 46 the height to which the liquid in the tank will rise before the latter is tilted may be readily varied at will; and when the tank is tilted, the rollers move to the opposite end thereof and are stopped by engagement with the bracket 42 which is suitably shaped for this purpose. After the liquid has been emptied from the tank the operator, in order to restore the latter to its filling position, causes the counterbalancing device to move to its initial position at the opposite end of the tank.

Crushed fruit or the like may be introduced into the freezing cylinder at any desired stage of the freezing operation, as the hollow valve plug 32 is in operative relation to the inlet 5 in either portion of the tank.

It will be seen that I have provided a device by means of which the quantity of mixture constituting the batch to be discharged into the freezing chamber may be readily determined with accuracy and uniformity. The construction is relatively simple and of a practical and advantageous character, and lends itself readily to the convenient operation of the freezer.

It is to be understood that while the invention has been herein illustrated and described with considerable particularity, it is contemplated that various changes may be made in form, arrangement and construction without departing from the spirit and scope of the invention as expressed in the following claims.

I claim as my invention:—

1. An ice cream freezer having, in combination, a horizontal cylinder provided near one end with an inlet opening, a supporting frame mounted upon the cylinder substantially centrally thereof, a batch tank having a valved outlet adapted to discharge into the cylinder inlet, supporting means for the tank including a pivotal bearing provided between said frame and said tank substantially centrally of the latter, a filling valve for the tank supported by said frame so as to discharge into the tank, a displacement chamber in the tank opposite the discharge end thereof and operable when the liquid flowing into the tank rises to a predetermined level to cause the tank to tilt on its bearings toward the discharge end thereof into an inclined position, and means operable in the tilting movement of the tank to close the filling valve.

2. The combination with an ice cream freezer having a horizontal cylinder provided near one end with an inlet opening, a supporting frame mounted upon the cylinder substantially centrally thereof, a batch tank having a valved outlet adapted to discharge into the cylinder inlet, supporting means for the tank including pivotal bearing provided between said frame and said tank substantially centrally of the latter, a filling valve for the tank supported by said frame so as to discharge into the tank, a displacement chamber in the tank opposite the discharge end thereof and operable when the liquid flowing into the tank rises to a predetermined level to cause the tank to tilt toward the discharge end thereof into an inclined position, means operable in the tilting movement of the tank to close the filling valve, and a counterbalancing device for the tank, adjustable to vary the quantity of mixture flowing to the tank.

3. The combination with an ice cream freezer having a horizontal cylinder provided near one end with an inlet opening, a supporting frame mounted upon the cylinder substantially centrally thereof, a batch tank having a valved outlet adapted to discharge into the cylinder outlet, supporting means for the tank including a pivotal bearing provided between said frame and said tank substantially centrally of the latter, a filling valve for the tank supported by said frame so as to discharge into the tank, a displacement chamber in the tank opposite the discharge end thereof and operable when the liquid flowing into the tank rises to a predetermined level to cause the tank to tilt on its bearing toward the discharge end thereof, means operable in the tilting movement of the tank to close the filling valve, and means to hold the tank in its tilted position while the liquid is discharged into the freezer cylinder.

4. The combination of an ice cream freezer cylinder, a tiltable tank mounted on said cylinder, valved means for discharging the mixture to be frozen into said tank, said tank having a valved outlet arranged to discharge into said cylinder, means comprising a displacement chamber in said tank for causing the latter to tilt into an inclined position toward said outlet when a predetermined quantity of the mixture has flowed into the tank, and means operable in the tilting movement of the tank to cut off the flow of mixture to the tank.

5. The combination of an ice cream freezer cylinder, a tiltable tank mounted on said cylinder, valved means for discharging the mixture to be frozen into said tank, said tank having a valved outlet arranged to discharge into said cylinder, means comprising a displacement chamber in said tank for causing the latter to tilt when a predetermined quantity of the mixture has flowed into the tank, means operable in the tilting movement of the tank to cut off the flow of mixture to the tank, and means for holding the tank in its tilted position while the mixture is being discharged therefrom.

6. The combination of an ice cream freezer cylinder, a tiltable tank mounted on said cylinder, valved means for discharging the mixture to be frozen into said tank, said tank having a valved outlet arranged to discharge into said cylinder, means comprising a displacement chamber in said tank for causing the latter to tilt when a predetermined quantity of the mixture has flowed into the tank, means operable in the tilting movement of the tank to cut off the flow of mixture to the tank, and a counterbalancing means for controlling the movements of the tank.

7. The combination of an ice cream freezer cylinder, a tiltable tank mounted on said cylinder, valved means for discharging the mixture to be frozen into said tank, said tank having a valved outlet arranged to discharge into said cylinder, means comprising a displacement chamber in said tank for causing the latter to tilt when a predetermined quantity of the mixture has flowed into the tank, means operable in the tilting movement of the tank to cut off the flow of mixture to the tank, a counterbalancing means for controlling the movement of the tank in one direction, and means for locking the tank against movement in the opposite direction during the discharge of liquid from the tank.

8. In an ice cream freezer, the combination of a cylinder, a tiltable batch tank mounted upon the cylinder and having a valved outlet adapted to discharge into the cylinder, valve means controlling a flow of mixture into said tank, means adapted to effect the tilting movement of the tank by the mixture when the level of the mixture attains a predetermined height in the tank, said valve means comprising a casing, a valve member normally tending to close the passageway through the casing, and a member carried by the tank and having an operative connection with said valve member so as to maintain it in its raised position in the normal position of the tank but permitting it to move into closed position in the tilted or discharging position of the tank.

9. In an ice cream freezer, the combination of a freezing chamber having an inlet, a batch tank mounted above said chamber and having an outlet arranged to discharge into said chamber inlet, valve-controlled means for discharging mixture into said tank, said valve means comprising a valve member, a casing in which said valve member is operable, said casing comprising an upper section and a lower section, the lower section depending into said tank, means whereby said tank is caused to tilt when the level of the mixture therein attains a predetermined height, and means for causing said valve member to move into its closed position upon such tilting movement of the tank comprising an arm rigid with the tank and protruding upwardly into the lower end of said valve casing and into operative engagement with said valve member.

10. In an ice cream freezer, the combination of a freezing chamber, a batch tank, means providing a pivotal bearing for tiltably supporting said tank, a valved outlet at one end of the tank adapted to discharge into the freezing chamber, valve-controlled means for discharging the mixture to be frozen into said tank, a displacement chamber in the end of said tank opposite the valved outlet adapted when the level of the liquid attains a predetermined height in the tank to cause the tank to tilt, and means operable in the tilting movement of the tank to actuate said valve means to cut off the flow of mixture to the tank.

11. In an ice cream freezer, the combination of a freezing chamber, a batch tank, a support providing a pivotal bearing for tiltably supporting said tank, a valved outlet at one end of the tank adapted to discharge into the freezing chamber, valve-controlled means for discharging the mixture to be frozen into said tank, means in said tank effective when a predetermined quantity of the mixture has flowed into the tank to displace a portion thereof and cause the tank to tilt, said valve means being operable in the tilting movement of the tank to cut off the flow of mixture thereto, and counter-balancing means for the tank adjustable to vary the quantity of the mixture necessary to effect the tilting of the tank.

12. In an ice cream freezer, the combination of a tiltable batch tank having an outlet adapted to discharge into the freezing chamber, a valve for controlling said outlet, valve-controlled means for discharging the mixture to be frozen into the tank, said means being operable in the tilting movements of the tank, and means for locking the tank in its discharging position comprising a slot in the outlet valve member and a stationary pin for entering said slot, said pin being adapted when the valve member is moved into its open position to prevent a reverse movement of the tank.

13. In an ice cream freezer, the combination of a freezing chamber having a filling opening, a batch tank tiltable with reference to the cylinder and having an outlet opening adapted to discharge into said filling opening, a rotary valve member for controlling said outlet opening, valve-controlled means adapted to discharge the liquid to be frozen into the tank, said means being automatically controlled by the tilting movement of the tank, and means for locking the tank in its discharging position comprising a pin and slot connection between said valve member and said chamber.

14. In an ice cream freezer, the combination of a tiltable batch tank having an outlet adapted to discharge into the freezing chamber, valve-means controlling the inlet to said tank operable in the normal position of the tank to discharge the mixture to be frozen into the tank and to cut off such flow of the mixture in the tilted position of the tank, means for automatically effecting such tilting movement of the tank, and a counterbalancing device adapted to control the movements of the tank in either direction.

15. In an ice cream freezer, the combination of a horizontal cylinder having a filling opening, a batch tank mounted to tilt with reference to said cylinder and having a valved outlet opening, valve-controlled means for discharging the mixture to be frozen into said tank, means for effecting the tilting movement of the tank, said valve controlled means being operable to cut off the flow of mixture to the tank when the latter is tilted, and a counterbalancing device for the tank comprising a pair of track members mounted upon the tank longitudinally thereof, a roller guided by said track members for movement from one side of the axis of the tank to the other, and an adjustable stop for determining the position of the roller at one end of the tank.

In testimony whereof, I have hereunto set my hand.

THEODORE L. VALERIUS.